United States Patent [19]
Snyder

[11] Patent Number: 5,688,302
[45] Date of Patent: Nov. 18, 1997

[54] CENTRIFUGING PROCESS FOR FORMING FIBERS

[75] Inventor: James G. Snyder, Newark, Ohio

[73] Assignee: Owens-Corning Fiberglas Technology Inc., Summit, Ill.

[21] Appl. No.: 502,038

[22] Filed: Jul. 12, 1995

[51] Int. Cl.⁶ .................................................. C03B 37/04
[52] U.S. Cl. .................... 65/461; 65/465; 65/523; 264/8; 264/DIG. 28
[58] Field of Search ........................... 65/455, 458, 459, 65/460, 461, 465, 469, 470, 517, 522, 523, 524; 264/8, DIG. 28, 211.14; 425/8, 66, 72.1, 72.2

[56] References Cited

U.S. PATENT DOCUMENTS

| | | | |
|---|---|---|---|
| 3,040,377 | 6/1962 | Slayter et al. | 65/522 X |
| 3,219,425 | 11/1965 | Stalego | 65/522 X |
| 3,372,011 | 3/1968 | Porter | 65/523 |
| 3,785,791 | 1/1974 | Perry . | |
| 3,928,009 | 12/1975 | Perry . | |
| 4,246,017 | 1/1981 | Phillips . | |
| 4,300,931 | 11/1981 | Phillips . | |
| 4,302,234 | 11/1981 | Guffey et al. . | |
| 4,303,430 | 12/1981 | Houston | 65/522 X |
| 4,318,725 | 3/1982 | Phillips . | |
| 4,359,444 | 11/1982 | Shah et al. | 65/523 X |
| 4,497,644 | 2/1985 | Kaveh . | |
| 4,601,742 | 7/1986 | Kaveh . | |
| 4,670,034 | 6/1987 | Goodridge et al. . | |

*Primary Examiner*—Melvin Mayes
*Attorney, Agent, or Firm*—C. Michael Gegenheimer; Curtis B. Brueske

[57] ABSTRACT

The method for forming fibers by introducing molten material into a spinner having a peripheral wall having a plurality of orifices and centrifuging the molten material through the orifices to create fibers, discharging gases from an opening in a first annular blower, the first blower positioned radially outward from the spinner, and where the gases from the first annular blower converge radially inwardly with respect to the spinner axis to partially attenuate the fibers and influence the flow path of the fibers towards a direction parallel to the spinner axis, and discharging gases from an opening in a second annular blower, the second blower being positioned radially outward from the first blower, and where the gases from the second annular blower converge radially inwardly with respect to the spinner axis to complete the attenuation of the fibers and influence the flow path of the fibers.

15 Claims, 2 Drawing Sheets

CENTRIFUGING PROCESS FOR FORMING FIBERS

TECHNICAL FIELD

This invention relates to a centrifuging process for forming fibers from molten material. More particularly this relates to fiberizers which use annular blowers to attenuate fibers.

BACKGROUND ART

A common practice in forming fibers from molten material is to pass material in a molten state through the orifices of the peripheral wall of a rotating spinner to create primary fibers. Thereafter, the primary fibers are attenuated into a downwardly moving generally cylindrical veil of secondary fibers by the action of a flow of gases discharged from an annular blower positioned circumferentially about the spinner. The fibers are then collected on a foraminous conveyor to produce a fibrous pack.

The blower typically comprises an annular manifold having a slot or a plurality of openings for directing gases downwardly and towards the fibers. The gases discharged from the blower have a pulling effect on the primary fibers, and the gases serve to attenuate the fibers to their final small diameter. The gases also serve to turn the fibers downwardly toward the conveyor. A passageway may also be provided over the top of the annular blower for the introduction of induced air by the discharging of gases from the blower.

In a typical fiberizer construction, a single annular blower is positioned relatively close to the peripheral wall of the spinner to effectively attenuate the primary fibers. This results in a cylindrical veil of secondary fibers which is slightly larger than the diameter of the spinner. In almost all cases it is necessary to widen the veil or distribute the veil in order to produce a fibrous pack which is wider than the original veil of fibers.

Numerous devices have been employed in the past to distribute the veil. These include various mechanical impingement devices and various forms of gaseous jets. The aim of each of these distribution techniques is to produce a fibrous pack having a uniform fiber density across the width of the product. However, devices which control the path or shape of the veil beyond the formation of the secondary fibers have not always distributed the fibers uniformly in a satisfactory manner. These distribution devices also can damage the fibers, particularly where mechanical impingement devices are used.

It would be desirable to have a method of forming a veil substantially wider than the diameter of the spinner to produce a fiber pack having a uniform density across the width. Also it would be advantageous to provide a method for attenuating fibers which minimizes fiber interference among the fibers during the attenuation process, and which enables the size and shape of the veil to be controlled.

DISCLOSURE OF INVENTION

There has now been invented an improved method of forming fibers by centrifuging molten material from a rotating spinner and discharging gases from at least two independently controlled annular blowers. The fibers are formed into a veil moving in a downward direction away from the spinner. The gases discharged from the blowers influence the flow path of the fibers. By influencing the flow path, the veil width can be increased, and this is advantageous for distribution purposes.

The present invention comprises introducing molten material into a rotating spinner having a peripheral wall which has a plurality of orifices, and centrifuging the molten material through the orifices to create fibers. Gases are discharged from an opening in a first annular blower, where the gases partially attenuate the fibers and influence the flow path of the fibers towards a direction parallel to the spinner axis. Gases are discharged from an opening in a second annular blower, where the gases complete the attenuation of the fibers and further influence the flow path of the fibers. The gases from the first blower and second blower may be controlled independently of each other to change the flow path of the fibers and manipulate the veil shape.

In a specific embodiment of the invention the gases discharged from both the first blower and the second blower are converging radially inwardly with respect to the spinner axis to intercept the fibers. In another embodiment the gases discharged from the second blower are diverging radially outwardly with respect to the spinner axis.

In another specific embodiment of the invention, the first blower opening is positioned radially outward from the spinner by a distance which is at least 5 percent of the diameter of the spinner. Also, the second blower opening is positioned radially outward from the first blower opening by a distance which is at least 5 percent of the diameter of the spinner. A third annular blower may also be added. Preferably, this third blower is positioned intermediate the first and second blowers. The gases discharged from the intermediate blower attenuate the fibers and influence the flow path of the fibers.

BEST MODE FOR CARRYING OUT THE INVENTION

The invention will be described in terms of a glass forming process. It is to be understood that the invention is equally applicable to other molten fiberizable materials, both organic materials such as polymers, and inorganic materials such as rock, slag, and basalt.

Figure 1:
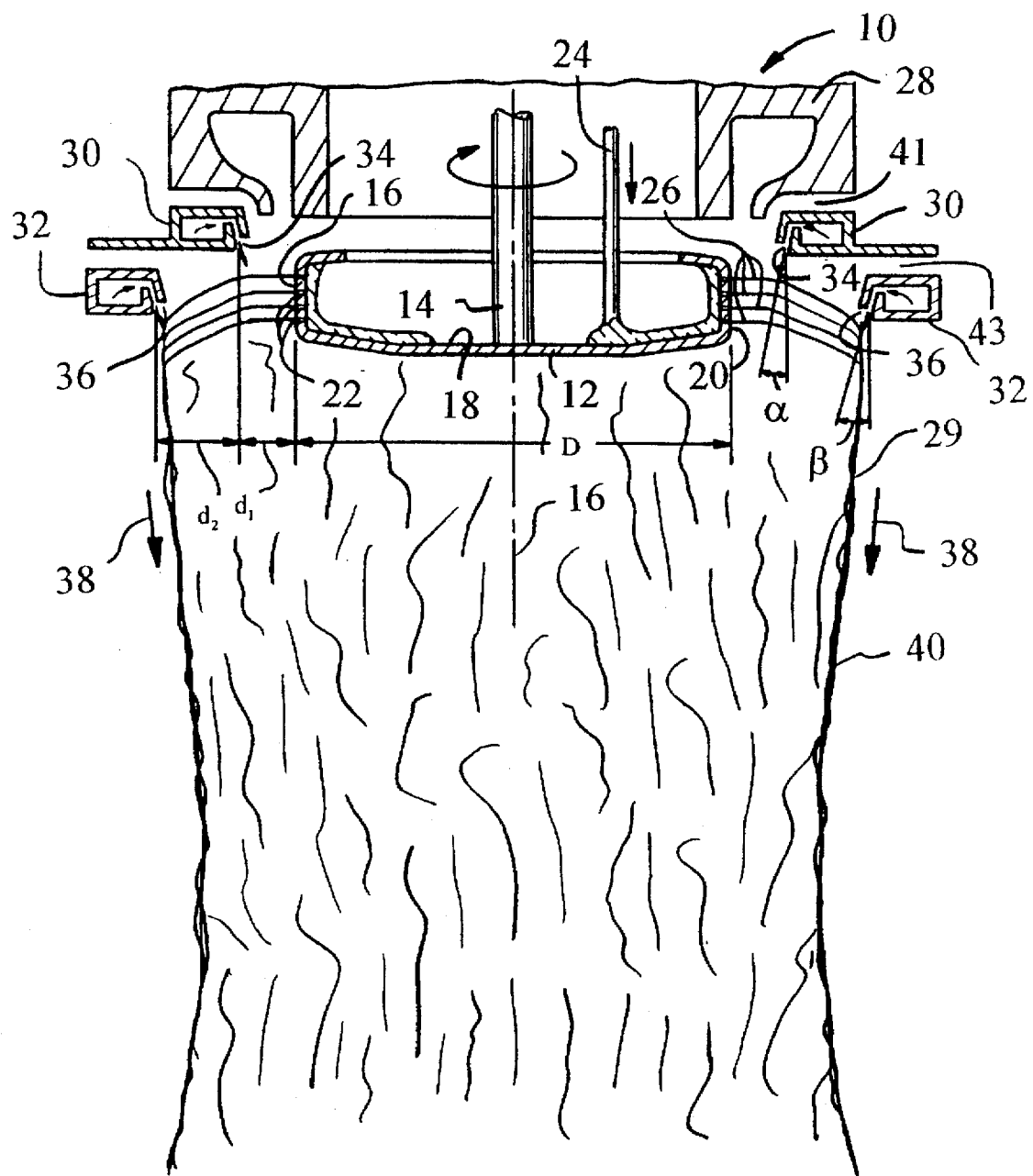
FIG. 1 is a cross-sectional view in elevation of a fiberizer of the present invention for the forming of fibers from a molten material.

There is illustrated in FIG. 1 a fiberizer of the present invention generally indicated at 10 for producing glass fibers. The fiberizer includes a spinner 12 having a spindle 14 attached at the spinner's axis of rotation 16. The spinner has a bottom wall 18 and a peripheral wall 20 having a plurality of orifices 22. The spinner can be made out of any suitable material, such as high temperature alloy materials known in the art of making glass fibers. Molten material, such as glass 24, is introduced into the rotating spinner as a stream and impinges on the spinner bottom wall and flows to the peripheral wall. The molten material is passed through the orifices by centrifugal force and forms primary fibers 26. The primary fibers can be maintained in an attenuable condition by heat supplied from an optional annular burner 28. The primary fibers are then formed into secondary fibers 29 by attenuation from gases discharged from a first annular blower 30 and a second annular blower 32. The blowers 30 and 32 discharge the gases from openings 34 and 36, respectively. The openings can be comprised of a plurality of holes or an inward facing annular slot. The fibers follow a flow path 38 and form a veil 40 that is moving in a downward direction away from the spinner. The fibers are then collected on a foraminous conveyor (not shown) to form a fibrous pack. Induced air passages 41 and 43 may also be provided directly above the blowers 30 and 32 respectively, for the introduction of induced air caused by the jet of gas discharging from the blowers.

As shown in FIG. 1, the primary fibers 26 leave the spinner and travel in a direction relatively perpendicular to the spinner axis 16. The gases discharged from the first blower 30 are converging radially inwardly with respect to the spinner axis at a first angle alpha, and intercept the primary fibers leaving the spinner. The gases from the first blower partially attenuate the fibers by a pulling action to reduce the diameter of the primary fibers. The gases also influence the flow path of the fibers by turning the fibers towards a direction parallel to the spinner axis.

The gases discharged from the second blower 32 are converging radially inwardly with respect to the spinner axis at a first angle beta, and the gases from the second blower complete the attenuation of the primary fibers into the secondary fibers which have their final small diameter. The gases further influence the flow path of the fibers to form the desired shape of the veil. Although FIG. 1 shows the gases from the second blower converging radially inwardly, the gases may also be discharged diverging radially outwardly with respect to the spinner axis to complete the attenuation of the primary fibers.

Preferably, the opening of the first blower is positioned radially outwardly from the peripheral wall 20 of the spinner by a distance $d_1$ which is at least 5 percent of the diameter D of the spinner. Most preferably $d_1$ is at least 10 percent of the diameter D of the spinner, and may be up to 20 percent. Likewise, it is preferable to position the opening of the second blower radially outwardly from the opening of the first blower by a distance $d_2$ which is at least 5 percent of the diameter D of the spinner. Most preferably $d_2$ is at least 10 percent of the diameter D of the spinner, and may be up to 20 percent.

Preferably, the angle alpha of the discharge gases from the first blower is within a range of from about 10 to about 15 degrees with respect to the spinner axis. Likewise it is preferable that angle beta is within a range of from about 0 to about 15 degrees. Also, in a preferred embodiment the difference in the angles of discharge of the gases from the first blower compared with the second blower is within the range of from about 1 to about 10 degrees, an more preferably within the range of from about 1 to about 5 degrees.

The two blowers 30 and 32, are used to increase the width of the veil to a width substantially greater than the width of the spinner, D. This forms a wider fibrous pack without the need to distribute the veil or will facilitate subsequent distribution. Air is supplied to each blower to provide the discharge gases. The air pressure in the blower will determine how the gases are discharged from the blowers. By independently controlling the gases from the two blowers, the flow path of the fibers and the shape of the veil can be manipulated. The gases can be controlled by either changing the position, changing the angle, or changing the pressure at which the gases are discharged. The veil may be formed into a cylindrical shape, or a slight hourglass shape, as shown in FIG. 1. The veil may also be shaped into a downwardly diverging conical shape by independently controlling the two blowers.

Figure 2:
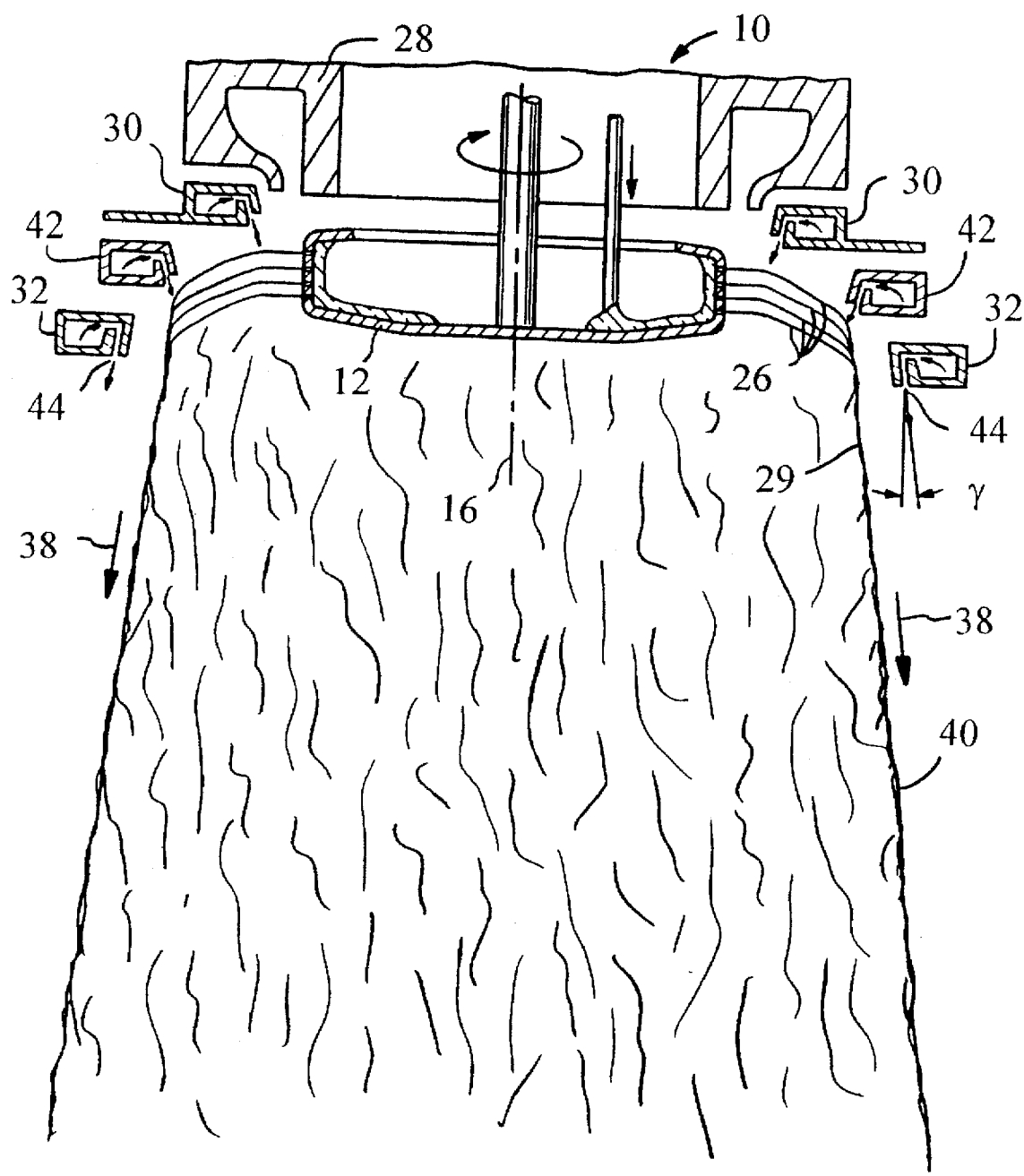
FIG. 2 is a cross-sectional view in elevation of another embodiment of the fiberizer.

The flow path of the fibers may be affected by adding at least one intermediate blower 42 positioned intermediate the first and second blowers 30 and 32, as shown in FIG. 2, such that there will be at least three annular blowers. The intermediate blower 42 will attenuate the fibers, and will affect the flow path of the fibers. The intermediate blower opening may be positioned radially outwardly from the first blower opening by a distance which is at least 5 percent of the diameter of the spinner, and which may be up to 20 percent of the diameter of the spinner. The difference between the angles of the discharging gases from the first blower and the intermediate blower is preferably within a range of from about 1 to about 10 degrees, and more preferably within a range of from about 1 to about 5 degrees.

Whether two or three blowers are used, the outermost blower can discharge gases in a diverging radially outwardly direction with respect to the spinner axis. This will expand the width of the veil, and expansion of the veil is advantageous for distribution purposes. As shown in FIG. 2, the outermost blower, second blower 32, discharges gases from an opening 44. The gases diverge radially outwardly with respect to the spinner axis at an angle gamma. Preferably, the angle gamma of the discharge gases from the diverging second blower is within a range of from about 5 to 15 degrees with respect to the spinner axis. The intermediate blower and second blower may be combined into one annular manifold having separate openings for the discharge of gases, where one of the openings is at an angle which is converging and the other is diverging. Where the discharging gases are discharged at an outwardly diverging angle, the flow path of the secondary fibers 29 will diverge downwardly and the veil diameter will increase, as shown in FIG. 2.

It will be evident from the foregoing that various modifications can be made to this invention. Such, however, are considered as being within the scope of the invention.

INDUSTRIAL APPLICABILITY

The invention can be useful in the method of forming glass fibers from molten glass in a centrifuging process.

I claim:

1. A method of forming fibers, comprising:

introducing molten material into a spinner rotating about an axis, the spinner having a peripheral wall having a plurality of orifices;

centrifuging the molten material through the orifices to create fibers;

discharging gases from an opening in a first annular blower, the gases converging radially inwardly with respect to the spinner axis to partially attenuate the fibers and influence the flow path of the fibers towards a direction parallel to the spinner axis; and discharging gases from an opening in a second annular blower which is positioned radially outwardly from the first blower, the gases diverging radially outwardly with respect to the spinner axis to complete the attenuation of the fibers and influence the flow path of the fibers.

2. The method of claim 1 comprising discharging gases from an opening in an intermediate annular blower positioned intermediate the first and second blowers to attenuate the fibers.

3. The method of claim 2 in which the gases discharged from the intermediate blower are converging radially inwardly with respect to the spinner axis.

4. The method of claim 1 in which the discharge of gases from both the first blower and second blower are controlled independently of each other to change the flow path of the fibers.

5. The method of claim 1 in which the gases discharged from the first blower are discharged at a first angle which is within a range of from about 10 to 15 degrees with respect to the spinner axis.

6. The method of forming fibers comprising:
   a. introducing molten material into a spinner rotating about an axis, the spinner having a peripheral wall which has a plurality of orifices;
   b. centrifuging the molten material through the orifices to create fibers;
   c. discharging gases from an opening in a first annular blower which is positioned radially outwardly from the spinner, the gases converging radially inwardly with respect to the spinner axis to attenuate the fibers and influence the flow path of the fibers towards a direction parallel to the spinner axis; and
   d. discharging gases from an opening in a second annular blower which is positioned radially outwardly from the first blower, the gases diverging radially outwardly with respect to the spinner axis to attenuate the fibers and influence the flow path of the fibers.

7. The method of claim 6 comprising discharging gases from at least three annular blowers, the outermost of which is the second annular blower which discharges gases diverging radially outwardly with respect to the spinner axis.

8. The method of claim 7 in which the blowers include a first annular blower and an intermediate blower, where the difference between the angles of the discharging gases from the first blower and the intermediate blower is within a range of from about 1 to about 10 degrees.

9. The method of claim 8 which the difference between the angles of the discharging gases from the first blower and the intermediate blower is within a range of from about 1 to about 5 degrees.

10. A method of forming fibers, comprising:

introducing molten material into a spinner rotating about an axis, the spinner having a peripheral wall having a plurality of orifices;

centrifuging the molten material through the orifices to create fibers;

discharging gases from an opening in a first annular blower, the first blower opening positioned radially outward from the spinner by a distance which is at least 5 and is up to 20 percent of the diameter of the spinner, wherein the gases from the first annular blower converge radially inwardly with respect to the spinner axis to partially attenuate the fibers and influence the flow path of the fibers towards a direction parallel to the spinner axis; and discharging gases from an opening in a second annular blower, the second blower opening positioned radially outward from the first blower opening by a distance which is at least 5 percent and is up to 20 percent of the diameter of the spinner, wherein the gases from the second annular blower diverge radially outwardly with respect to the spinner axis to complete the attenuation of the fibers and influence the flow path of the fibers.

11. The method of claim 10 in which the opening of the first blower is positioned radially outwardly from the spinner by a distance which is at least 10 and is up to 20 percent of the diameter of the spinner.

12. The method of claim 10 in which the opening of the second blower is positioned radially outwardly from the first blower opening by a distance which is at least 10 and is up to 20 percent of the diameter of the spinner.

13. The method of claim 10 further comprising discharging gases from an opening in an intermediate annular blower, where the intermediate blower opening is positioned intermediate the first and second blowers.

14. The method of claim 13 in which the intermediate blower opening is positioned radially outwardly from the first blower opening by a distance which is at least 5 percent and is 20 percent of the diameter of the spinner.

15. The method of claim 10 in which the discharge of gases from the first blower and second blower are controlled independently of each other to change the flow path of the fibers.

* * * * *

UNITED STATES PATENT AND TRADEMARK OFFICE
CERTIFICATE OF CORRECTION

PATENT NO. : 5,688,302
DATED : November 18, 1997
INVENTOR(S) : James G. Snyder

It is certified that error appears in the above-identified patent and that said Letters Patent is hereby corrected as shown below:

In the abstract, line 13 & 14, "converge radially inwardly with respect to the spinner axis to" should be - -diverge radially outwardly with respect to the spinner axis to- -.

Signed and Sealed this

Twenty-first Day of April, 1998

Attest:

BRUCE LEHMAN

*Attesting Officer*  *Commissioner of Patents and Trademarks*